(12) United States Patent
Lai

(10) Patent No.: US 8,537,668 B2
(45) Date of Patent: *Sep. 17, 2013

(54) HANDHELD ELECTRONIC DEVICE INCLUDING VOICE OVER IP QUALITY INDICATOR, AND ASSOCIATED METHOD

(75) Inventor: Frederick Lai, Orleans (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,414

(22) Filed: Dec. 1, 2009

(65) Prior Publication Data

US 2010/0074136 A1    Mar. 25, 2010

Related U.S. Application Data

(63) Continuation of application No. 11/671,537, filed on Feb. 6, 2007, now Pat. No. 7,668,088.

(51) Int. Cl.
*G01R 31/08* (2006.01)
(52) U.S. Cl.
USPC .......................... 370/230; 370/235; 370/328
(58) Field of Classification Search
CPC ..... H04L 47/10; H04L 47/2416; H04L 47/14; H04L 29/06027; H04L 29/06523
USPC .............. 370/230, 231, 235, 328; 379/32.04
See application file for complete search history.

(56) References Cited

U.S. PATENT DOCUMENTS

| | | | |
|---|---|---|---|
| 6,452,588 | B2 | 9/2002 | Griffin et al. |
| 6,489,950 | B1 | 12/2002 | Griffin et al. |
| 6,965,562 | B2 * | 11/2005 | Tuomi ........................... 370/230 |
| 2001/0043577 | A1 | 11/2001 | Barany et al. |
| 2005/0041622 | A1 | 2/2005 | Dubuc et al. |
| 2005/0074012 | A1 | 4/2005 | Garakani et al. |
| 2005/0128955 | A1 * | 6/2005 | Chang et al. ................... 370/252 |
| 2005/0233728 | A1 | 10/2005 | Karaoguz et al. |
| 2006/0045074 | A1 * | 3/2006 | Lee ................................ 370/352 |

(Continued)

FOREIGN PATENT DOCUMENTS

| | | |
|---|---|---|
| EP | 1 111 822 A2 | 6/2001 |
| WO | 03/036889 A | 5/2003 |

OTHER PUBLICATIONS

Examination Report mailed Nov. 30, 2010; in corresponding application No. 07101825.3.
Canadian Office Action mailed on May 24, 2011; in corresponding application No. 2,619,314.
Examination Report mailed Aug. 2, 2010; in corresponding application No. 07101825.3.

(Continued)

*Primary Examiner* — Jung Park
(74) *Attorney, Agent, or Firm* — Novak Druce Connolly Bove + Quigg LLP

(57) ABSTRACT

A method of placing a call from a handheld device to a receiving device using VoIP includes initiating the call, transmitting a plurality of voice data packets to the receiving device, determining whether the receiving device has detected one or more missing or delayed packets, and providing a poor voice service indicator if it is determined that the receiving device has detected one or more missing or delayed data packets. Also, a method of placing a call to a receiving device over a network system which allocates bandwidth includes sending a request to the network system for a bandwidth allocation for the telephone call, determining whether the request has been granted, providing a poor voice service indicator to the user of the handheld electronic device if it is determined that the request has not been granted, and transmitting a plurality of voice data packets to the receiving device.

13 Claims, 3 Drawing Sheets

(56) References Cited

U.S. PATENT DOCUMENTS

2006/0268824 A1  11/2006  Dhesikan et al.
2008/0031425 A1   2/2008  Glynn et al.
2008/0062887 A1*  3/2008  Parolkar et al. ............... 370/252

OTHER PUBLICATIONS

Office Action mailed Jul. 11, 2012, in corresponding Canadian patent application No. 2,619,314.

* cited by examiner

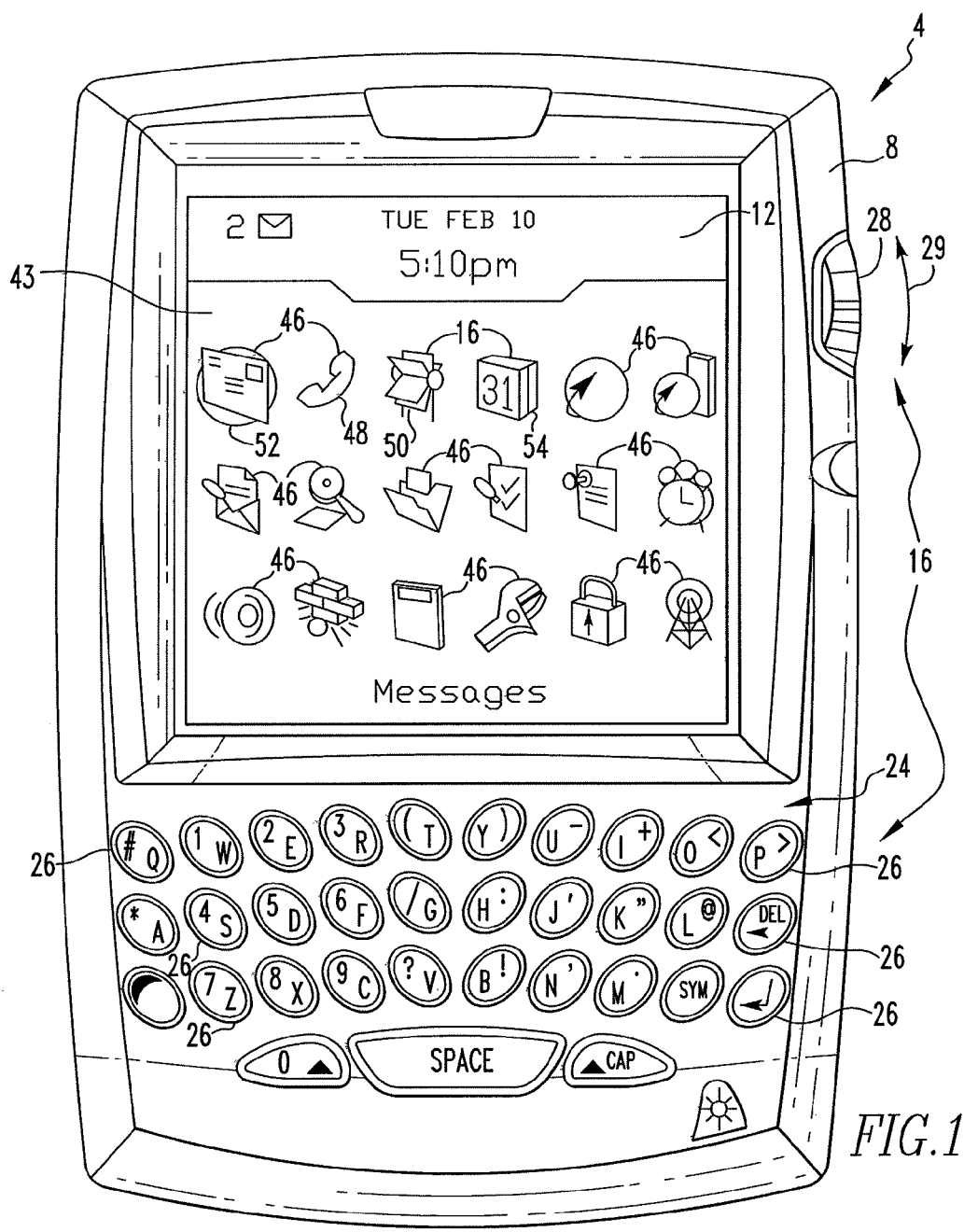
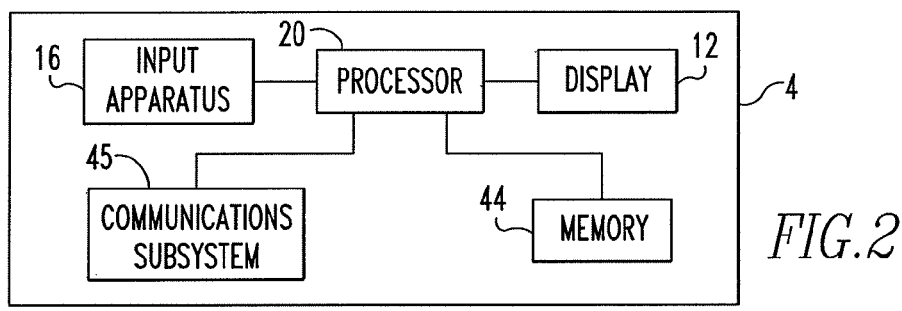

HANDHELD ELECTRONIC DEVICE INCLUDING VOICE OVER IP QUALITY INDICATOR, AND ASSOCIATED METHOD

CROSS-REFERENCE TO RELATED APPLICATIONS

The instant application is a continuation of U.S. patent application Ser. No. 11/671,537 filed Feb. 6, 2007, which issued as U.S. Pat. No. 7,668,088 on Feb. 23, 2009,entitled "Handheld Electronic Device Including Voice Over IP Quality Indicator, and Associated Method," the contents of which are incorporated herein by reference.

BACKGROUND

1. Technical Field

The embodiments described herein relate generally to handheld electronic devices and, more particularly, to a handheld electronic device and associated method that provides an indication to a user thereof of the quality of the current conditions for performing voice over IP communications using the handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Examples of handheld electronic devices are included in U.S. Pat. Nos. 6,452,588 and 6,489,950.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among and within these applications.

Traditionally, handheld electronic devices that include telephone functionality do so using cellular technology and systems which implement circuit-switched voice telephone communications via cellular radio channels. In cellular systems, large geographic areas are divided into smaller coverage areas called cells. Each cell includes a base station that handles calls on different channels and communicates with a central processing unit, called a switch or terminal, to facilitate the handing-off of calls from one cell to another as a user moves through the system.

Another type of telephony technology that is gaining in popularity and is being implemented with increased frequency in handheld electronic devices is known as voice over IP (VoIP). Unlike cellular technology, VoIP is not a circuit-switched system. Instead, VoIP provides voice telephony services over Internet Protocol (IP) connections. IP is a connectionless best-effort packet switching protocol that provides packet routing, fragmentation and re-assembly of data, such as voice data in a VoIP system, through the data link layer. VoIP can be implemented both in a wired and a wireless system, with the latter being utilized most frequently in handheld electronic devices.

A problem that exists with current wireless VoIP systems is that, because voice packets are sent on a best-efforts basis, network congestion can interfere with voice communications even though the wireless coverage/signal is good. Typically, users of handheld electronic devices that include VoIP telephony functionality will attempt a call without knowing the extent to which the network is being used, i.e., its level of congestion. Thus, if the network is highly congested, the users will likely experience poor voice quality on the attempted VoIP call. However, because the strength of the wireless signal may be good (as indicated by the signal strength indicator provided on the device), users will typically become confused and blame the poor voice quality on the phone hardware.

One way in which VoIP technology may be implemented is in conjunction with WiFi systems wherein VoIP calls are transmitted over 802.11 WiFi networks. In such an implementation, a caller is able to make a connection using a local wireless Internet access point. In the future, Quality of Service (QoS) protocols, such as WiFi's Admission Control/Tspec bandwidth reservation system will allow voice calls to run more smoothly over 802.11 systems. The normal procedure under such a protocol that includes a bandwidth reservation system includes the following steps: (i) request bandwidth for a voice call, (ii) receive bandwidth allocation for the call, (iii) place the call, (iv) when finished, end the call, and (v) relinquish the bandwidth allocation. If the bandwidth reservation system is implemented properly, the call will go through clearly even if there are concurrent spurts of high volume data being communicated on the same network. There are, however, cases where the requested bandwidth cannot be guaranteed due to call volumes. In particular, in some cases, after the bandwidth allocation is requested, it may be denied due to insufficient resources. Notwithstanding this fact, some VoIP enabled phones may be programmed to place the call anyway on a best-effort basis (for example, in the case of an emergency call). Of course, in such a case, there may be poor voice quality which again a user may blame on the phone hardware.

Thus, there is a need for an improved handheld electronic device that provides an indication to a user thereof of the quality of the current conditions for performing VoIP communications using the handheld electronic device.

BRIEF DESCRIPTION OF THE DRAWINGS

A full understanding of the invention can be gained from the following Description of the Preferred Embodiment when read in conjunction with the accompanying drawings in which:

FIG. 1 is a front view of an improved handheld electronic device according to one embodiment;

FIG. 2 is a block diagram of the handheld electronic device of FIG. 1; and

DESCRIPTION OF THE PREFERRED EMBODIMENTS

Figure 3:
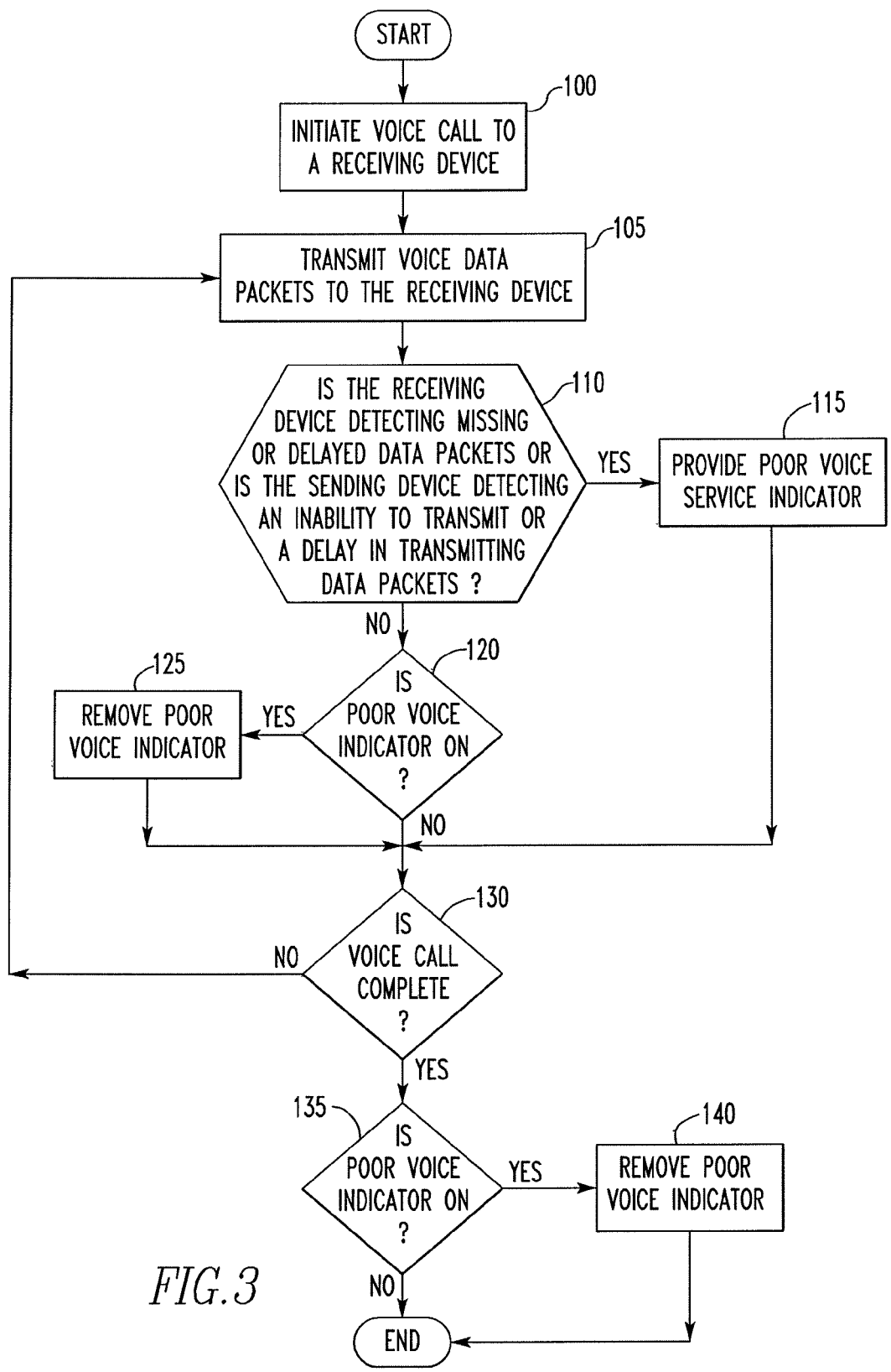
FIG. 3 is a flowchart illustrating a first embodiment of a method for providing an indication to a user of the quality of the current conditions for performing VoIP communications using the handheld electronic device shown in FIGS. 1 and 2.

In one embodiment, a method of placing a telephone call from a handheld electronic device to a receiving device using voice over IP technology is provided that includes initiating the telephone call to the receiving device, transmitting a plurality of voice data packets to the receiving device, monitoring at least one of (i) whether the receiving device has detected one or more missing or delayed ones of the voice data packets, and (ii) whether the sending device has detected an inability to transmit or a delay in transmitting one or more particular ones of the voice data packets, and providing a poor voice service indicator to a user of said handheld electronic device if at least one of the following is determined: (i) that the receiving device has detected one or more missing or delayed ones of the voice data packets, or (ii) the sending device has detected an inability to transmit or a delay in transmitting one or more particular ones of the voice data packets. Also provided is a handheld electronic device that implements this method.

In another embodiment, a method of placing a telephone call from a handheld electronic device to a receiving device over a network system which allocates bandwidth upon request is provided. The method includes steps of sending a request to the network system for a bandwidth allocation for the telephone call, determining whether the request has been granted and the bandwidth allocation has been provided, providing a poor voice service indicator to the user of the handheld electronic device if it is determined that the request has not been granted and the bandwidth allocation has not been provided, and transmitting a plurality of voice data packets to the receiving device (this step may be performed after or some time prior to the providing step). Also provided is a handheld electronic device that implements this method.

An improved handheld electronic device 4 in accordance with one particular embodiment is depicted generally in FIGS. 1 and 2. The handheld electronic device 4 includes a housing 8, a display 12, an input apparatus 16, and a processor 20 (FIG. 2) which may be, without limitation, a microprocessor (µP). The processor 20 is responsive to inputs received from the input apparatus 16 and provides outputs to the display 12. The handheld electronic device 4 is of a type that includes a wireless telephone capability that, as described below, is preferably capable of both cellular and VoIP communications.

As can be understood from FIG. 1, the input apparatus 16 includes a keyboard 24 having a plurality of keys 26, and a rotatable trackwheel 28. As used herein, the expression "key" and variations thereof shall refer broadly to any of a variety of input members such as buttons, switches, and the like without limitation. The keys 26 and the rotatable trackwheel 28 are input members of the input apparatus 16, and each of the input members has a function assigned thereto.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of applications executable by processor 20 for the processing of data. The applications can be in any of a variety of forms such as, without limitation, software, firmware, and the like, and the term "application" as used herein shall refer to and include one or more routines, subroutines, function calls or the like, alone or in combination.

As is also shown in FIG. 2, processor 20 is in electronic communication with communications subsystem 45. Communications functions for handheld electronic device 4, including data and voice communications, are performed through communications subsystem 45. Communications subsystem 45 preferably includes a transmitter and a receiver (possibly combined in a single transceiver component), a SIM card, and one or more antennas. Other known components, such as a digital signal processor and a local oscillator, may also be part of communications subsystem 45. In the embodiment shown in FIGS. 1 and 2, the communications subsystem 45 is adapted to selectively provide the ability to conduct voice communications either using cellular technology (via a variety of voice communications networks, such as AMPS, TDMA, CDMA, PCS, GSM) or using VoIP technology. A device with such dual functionality is often referred to as a hybrid device. The specific design and implementation of communications subsystem 45 as described is dependent upon the communications network in which handheld electronic device 4 is intended to operate and is within the ordinary skill of the art, and thus will not be described further herein.

In FIG. 1, the display 12 is depicted as displaying a home screen 43 that includes a number of applications depicted as discrete icons 46, including, without limitation, an icon representing a phone application 48, an address book application 50, a messaging application 52 which includes email, SMS and MMS applications, and a calendar application 54. In FIG. 1, the home screen 43 is currently active and would constitute a portion of an application. Other applications, such as phone application 48, address book application 50, messaging application 52, and calendar application 54 can be initiated from the home screen 43 by providing an input through the input apparatus 16, such as by rotating the thumbwheel 28 and providing a selection input by translating the trackwheel 28 in the direction indicated by the arrow 29 in FIG. 1.

FIG. 3 is a flowchart illustrating a first embodiment of a method performed by the processor 20 of the handheld electronic device 4 for providing an indication to a user thereof of the quality of the current conditions for performing VoIP communications using the handheld electronic device 4. As will be appreciated, the method may be implemented in one or more routines stored in the memory 44 and executed by the processor 20. The method begins at step 100, wherein the handheld electronic device 4, through the communications subsystem 45, initiates a phone call using VoIP technology to a particular receiving device (including, for instance, dialing, manually or automatically, a phone number associated with the receiving device). The receiving device may be, without limitation, another handheld electronic device or a land line telephone. Then, at step 105, after the call to the receiving device is initiated, the handheld electronic device 4, through the communications subsystem 45, transmits voice data packets to the receiving device using VoIP technology. Next, at step 110, a determination is made as to whether either: (i) the receiving device is detecting missing or delayed data packets, or (ii) the sending device is detecting an inability to transmit or a delay in transmitting one or more data packets to the receiving device. If the answer at step 110 is yes, meaning that missing or delayed data packets are being detected, then that is an indication of network congestion and thus poor conditions for VoIP calls (even though the wireless signal strength may be good), and at step 115 a poor voice service indicator is provided to the user.

As is known, the receiving device may detect missing or delayed data packets as follows. In VOIP, the media stream is sent via the Real Time Transport Protocol (RTP) by the sending device in its own connection. This is different from the control connection, which runs over SIP (RFC 3261). RTP packets are sequenced and each packet is labeled. Thus, if packets are missing, the RTP stack will know because there is a break in the sequence numbers. This information is typically sent back to the user application. In our case, the user application could be set up to update the VOIP quality indicator. In addition, in RTP there are services available in the protocol itself which allow the user of the connection to send periodic reports called Receiver Reports and Sender Reports. They contain essentially the same information. These reports contain the number of dropped packets, last sequence number received, inter-arrival jitter information, etc. This information can be used to infer whether or not data loss has occurred and hence the quality of the current VOW stream. In addition, as is also known, the sending device may, for example, detect an inability to transmit or a delay in transmitting one or more data packets as follows. In some radio access technologies (such as 802.11), there are additional faculties that could potentially be leveraged to determine VOIP quality. In essence, if the radio layer is having difficulty sending packets to the Access Point (or cellular base station), then it is possible for a message to be sent up the stack to flag of potential delays or losses in sending data. For example, in 802.11, Ack messages from the Access Point are not received for packets sent to the AP, or transmission requests to the AP that are not successful. This is possibly due to interference. In GPRS, transmit requests are not available due to transmit timeslots not being available to the mobile station. This could be used to lower the VOW quality index displayed to the user.

Preferably, the poor voice service indicator will be a predetermined icon that is provided at a predetermined location on the display 12, such as next to a signal strength indicator icon that appears on many current handheld electronic devices. Note, the poor voice service indicator is separate and independent of the signal strength indicator and does not depend on the strength of the wireless (RF) signal being received by the handheld electronic device 4. Alternatively, the poor voice service indicator that is provided to the user may be, without limitation, in the form of some other type of visible, tactile or audible alert, such as a flashing LED, a vibration or a beeping sound or the like.

If, however, the answer at step 110 is no, meaning that missing or delayed data packets are not currently being detected, then, at step 120, a determination is made as to whether the poor voice service indicator is currently being provided (as a result of prior processing which detected that missing or delayed data packets were then being received). If the answer at step 120 is yes, then, at step 125, the poor voice service indicator is removed as it is not currently necessary (given the outcome at step 110). Following step 115, or if the answer at step 120 is no, the method proceeds to step 130, wherein a determination is made as to whether the voice call is complete. If the answer is no, then the method returns to step 105 for further processing. If the answer at step 130 is yes, then, at step 135, a determination is made as to whether the poor voice service indicator is currently being provided (as a result of prior processing during the call which detected that missing or delayed data packets were then being received). If the answer at step 135 is no, then the method ends. If the answer at step 135 is yes, then, at step 140, the poor voice service indicator is removed as it is not currently necessary (given that the call is completed), and the method ends.

Figure 4:
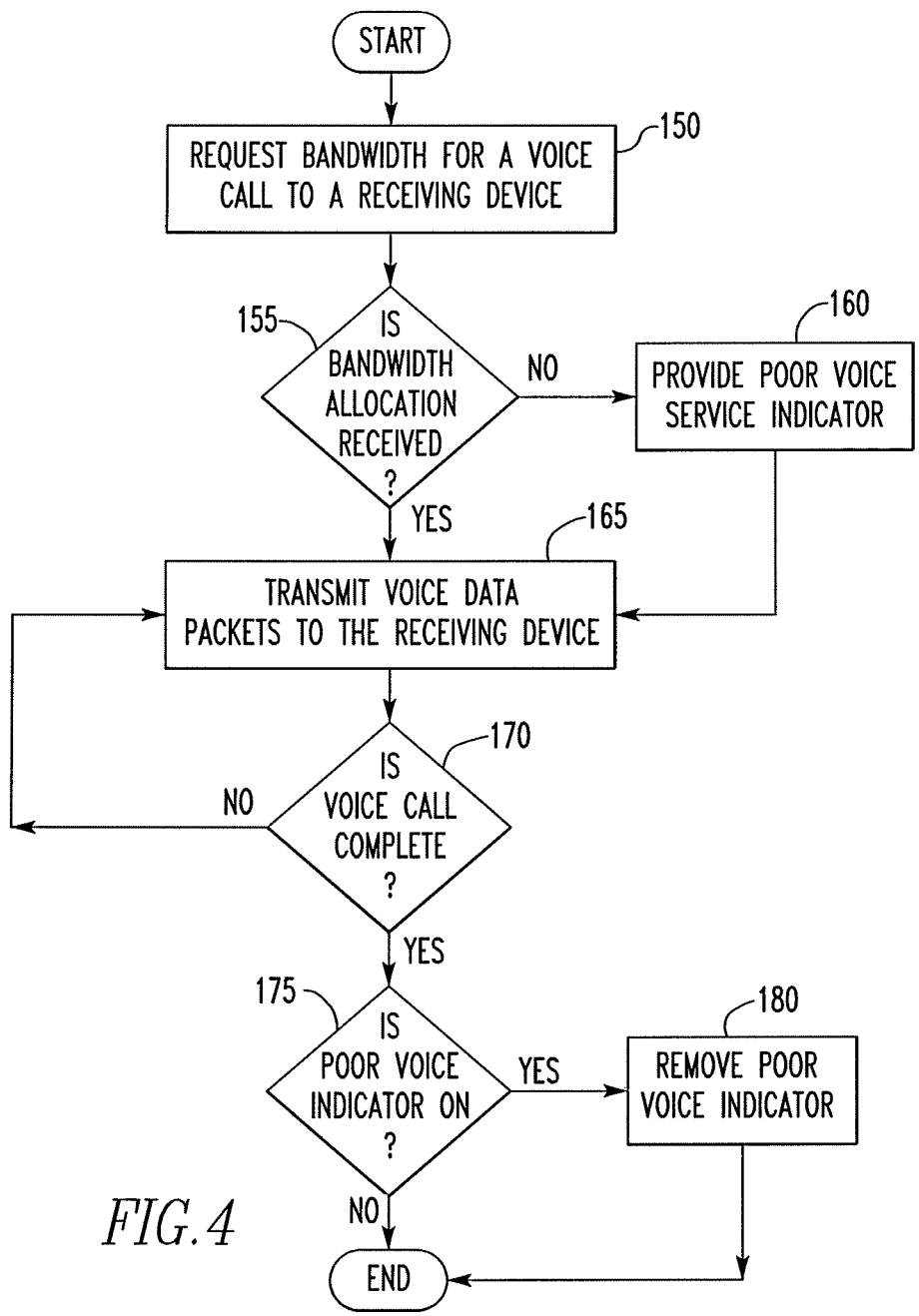
FIG. 4 is a flowchart illustrating a second embodiment of a method for providing an indication to a user of the quality of the current conditions for performing VoIP communications using the handheld electronic device shown in FIGS. 1 and 2.

FIG. 4 is a flowchart illustrating a second embodiment of a method performed by the processor 20 of the handheld electronic device 4 for providing an indication to a user thereof of the quality of the current conditions for performing VoIP communications using the handheld electronic device 4 in a system that employs a Quality of Service (QoS) protocol, such as WiFi's Admission Control/T-spec bandwidth reservation system, that allocates bandwidth for particular communications. As described elsewhere herein, there are cases where the requested bandwidth cannot be guaranteed due to high call volumes, in which case, after the bandwidth allocation is requested, it may be denied due to insufficient resources. Not withstanding this fact, the handheld electronic device 4 may be programmed, or the user may elect, to place the call anyway on a best-effort basis (which is assumed in the method shown in FIG. 4). Of course, in such a case, there may be poor voice quality which the user may blame on the hardware of the handheld electronic device 4. The method shown in FIG. 4 addresses this problem by providing information to the user relating to the quality of the current conditions for performing VoIP communications so that the user will not unnecessarily blame the hardware of the handheld electronic device 4. As will be appreciated, the method may be implemented in one or more routines stored in the memory 44 and executed by the processor 20.

The method shown in FIG. 4 begins at step 150, wherein the handheld electronic device requests a bandwidth allocation (e.g., from a WiFi system employing WiFi's Admission Control/T-spec bandwidth reservation system or some similar system employing a similar Quality of Service (QoS) protocol) for a voice call to be placed to a receiving device using VoIP technology. Next, at step 155, a determination is made as to whether the requested bandwidth allocation is received (i.e., whether the request is rejected by the system in question). If the answer at step 155 is no, meaning the request has been rejected, then, at step 160, a poor voice service indicator, in one or more of the various forms described elsewhere herein, is provided to the user. Then, at step 165, the handheld electronic device 4, through the communications subsystem 45, transmits voice data packets to the receiving device using VoIP technology (again, method 4 assumes that the call will proceed despite the lack of a bandwidth allocation). If the answer at step 155 is yes, then the method proceeds directly to step 165 (without providing the poor voice service indicator).

Following step 165, the method proceeds to step 170, wherein a determination is made as to whether the voice call is complete. If the answer is no, then the method returns to step 165 for further processing. If the answer at step 170 is yes, then, at step 175, a determination is made as to whether the poor voice service indicator is currently being provided (as a result of prior processing during the call which determined that a bandwidth was not allocated for the call). If the answer at step 175 is no, then the method ends (and the bandwidth that was allocated is relinquished). If the answer at step 175 is yes, then, at step 180, the poor voice service indicator is removed as it is not currently necessary (given that the call is completed), and the method ends.

Thus, the methods described herein address problems faced by current devices when attempting VoIP communications during conditions that are not ideal for such communications by providing an indicator to a user of the device of the quality of the current conditions for performing VoIP communications. As a result, the user is lees likely to become frustrated and blame the device hardware for poor call quality.

While preferred embodiments have been described and illustrated above, it should be understood that these are exemplary and are not to be considered as limiting. Additions, deletions, substitutions, and other modifications can be made without departing from the spirit or scope hereof. For example, the certain methods described herein are not limited to VoIP technology, and may also be applied to systems that employ CDMA, GSM, and IDEN, among other protocols. Accordingly, the invention is not to be considered as limited by the foregoing description but is only limited by the scope of the appended claims.

What is claimed is:

1. A method of placing a telephone call from a handheld electronic device to a receiving device wherein said telephone call is to be transmitted over a data network as a number of voice data packets, comprising:
   initiating on said handheld electronic device said telephone call to said receiving device;
   attempting to transmit a plurality of said voice data packets of said telephone call from said handheld electronic device to said receiving device;
   determining in said handheld electronic device that the handheld electronic device has detected an inability to transmit or a delay in transmitting, one or more particular ones of said voice data packets to the receiving device, without relying on information received from said receiving device; and
   in response to said determining, providing from said handheld electronic device a poor voice service indicator.

2. The method according to claim 1, wherein said handheld electronic device includes a display, and wherein said poor voice service indicator is provided on said display.

3. The method according to claim 2, wherein said poor voice service indicator is an icon provided on said display.

4. The method according to claim 1, wherein said poor voice service indicator is provided as at least one of an audible, visual or tactile alert.

5. The method according to claim 1, further comprising receiving a message from said receiving device indicating whether said receiving device has detected one or more missing or delayed ones of said voice data packets, wherein said determining step is based on said message.

6. The method according to claim 1, wherein said attempting to transmit step comprises attempting to transmit said plurality of voice data packets to said receiving device using a voice over IP protocol.

7. The method according to claim 1, wherein said data network includes the Internet and wherein said number of voice data packets are created using voice over IP technology.

8. A handheld electronic device, comprising:
   a processor;
   a communications subsystem in electronic communication with said processor, said communications subsystem being structured to perform communications by transmitting voice data as a number of data packets over a data network; and
   a memory in electronic communication with said processor, said memory storing one or more routines executable by said processor, said one or more routines having instructions for:
      causing said communications subsystem to initiate a telephone call to a receiving device;
      causing said communications subsystem to attempt to transmit a plurality of voice data packets to said receiving device over said data network;
      determining in said handheld electronic device that the handheld electronic device has detected an inability to transmit or a delay in transmitting, one or more particular ones of said voice data packets to the receiving device, without relying on information received from said receiving device; and
      causing said handheld electronic device to provide a poor voice service indicator in response to said determining.

9. The handheld electronic device according to claim 8, further comprising a display, wherein said one or more routines have further instructions for causing said poor voice service indicator to be provided on said display.

10. The handheld electronic device according to claim 9, wherein said poor voice service indicator is an icon provided on said display.

11. The handheld electronic device according to claim 8, wherein said one or more routines have further instructions for causing said poor voice service indicator to be provided as at least one of an audible, visual or tactile alert.

12. The handheld electronic device according to claim 8, wherein said communications subsystem receives a message from said receiving device indicating whether said receiving device has detected one or more missing or delayed ones of said data packets, and wherein said determining step is based on said message.

13. The handheld electronic device according to claim 8, wherein said data network includes the Internet and wherein said communications subsystem is structured to perform communications by transmitting voice data as a number of data packets using voice over IP technology.

* * * * *